(12) United States Patent
Zhang

(10) Patent No.: US 7,733,249 B2
(45) Date of Patent: Jun. 8, 2010

(54) METHOD AND SYSTEM OF COMPRESSING AND DECOMPRESSING DATA

(76) Inventor: Qin Zhang, 415 S. Oxford Ave. #304, Los Angeles, CA (US) 90020

( * ) Notice: Subject to any disclaimer, the term of this patent is extended or adjusted under 35 U.S.C. 154(b) by 293 days.

(21) Appl. No.: 11/654,827

(22) Filed: Jan. 18, 2007

(65) Prior Publication Data
US 2008/0175312 A1    Jul. 24, 2008

(51) Int. Cl.
*H03M 7/00*    (2006.01)
(52) U.S. Cl. .......................... 341/107; 341/51; 341/65; 341/67; 341/106; 382/232; 382/239; 382/245
(58) Field of Classification Search ........... 341/51–107; 382/232, 239
See application file for complete search history.

(56) References Cited

U.S. PATENT DOCUMENTS

| | | | | | |
|---|---|---|---|---|---|
| 5,396,595 | A | * | 3/1995 | Standley ....................... | 710/68 |
| 5,953,723 | A | * | 9/1999 | Linoff et al. ................. | 707/102 |
| 6,577,254 | B2 | * | 6/2003 | Rasmussen ................... | 341/51 |
| 6,618,506 | B1 | * | 9/2003 | Auerbach et al. ........... | 382/232 |
| 6,636,642 | B1 | * | 10/2003 | Yokose ....................... | 382/238 |
| 6,670,897 | B1 | * | 12/2003 | Lin ............................. | 341/65 |
| 6,731,814 | B2 | * | 5/2004 | Zeck et al. .................. | 382/239 |
| 6,737,991 | B1 | * | 5/2004 | Meroth et al. .................. | 341/51 |
| 6,804,401 | B2 | * | 10/2004 | Nelson et al. ................ | 382/239 |
| 6,819,271 | B2 | * | 11/2004 | Geiger et al. .................. | 341/51 |
| 7,088,268 | B2 | * | 8/2006 | Tsang ........................... | 341/58 |
| 7,142,603 | B2 | * | 11/2006 | Luna et al. ............. | 375/240.23 |
| 7,184,598 | B2 | * | 2/2007 | Abe et al. ..................... | 382/232 |
| 2002/0101367 | A1 | * | 8/2002 | Geiger et al. .................. | 341/51 |
| 2006/0170574 | A1 | * | 8/2006 | Itani ............................. | 341/51 |
| 2007/0194953 | A1 | * | 8/2007 | Cho ............................. | 341/50 |

\* cited by examiner

*Primary Examiner*—Linh V Nguyen

(57) ABSTRACT

The present invention relates to a data compression and decompression system and method for lossless compressing digital data. In one preferred embodiment, the method for handling a data stream having a number of data objects comprising a step of performing a compressing process on a data object based on a compression based value to obtain at least one compressed data result, wherein the data object is considered as one numerical value. The device for handling the data stream comprising a compression means for compressing the data objects according to a compression base value. In another preferred embodiment, the method for handling data having a number of data objects comprising a step of performing a compressing process on a data object by obtaining a compression code for the data object according to a compression coding table, wherein the data object is considered as one numerical value. The device for handling a data stream comprising a compression means for compressing the data objects according to a compression coding table.

18 Claims, 9 Drawing Sheets

METHOD AND SYSTEM OF COMPRESSING AND DECOMPRESSING DATA

FIELD OF THE INVENTION

The present invention relates to a data compression and decompression system and method for lossless compression of digital data. The invention further relates to a computer program product with a computer-readable medium and a computer program stored on the computer-readable medium with program coding means which are suitable for carrying out such a method when the computer program is run on a computer.

BACKGROUND OF THE INVENTION

We live in an information age, wherein information is mostly obtained, processed, stored and communicated in digital data form. Efforts were made to compress data so that storage space and transition time could be saved. Traditional data compressing method generally uses encoding means to obtain digital codes representing various information ordinary in numeric form, word form, images, sounds, etc. separately and/or in combination. With the traditional data compressing methods, the compressed information will be in digital data format, but the data compressing process cannot be repeated. Thus, the traditional data compressing method can only compress the data by limited percentages. This presents problems for current information process, especially information storage and communication process.

The present invention provides a new data compressing and decompressing method and system. The present invention can be used to compressed data repeatedly. Therefore, the compressed data results could be reduced significantly. Thus, the present invention will greatly improve information process, especially in information storage and communication process. For example, video signals and motion pictures contain vast amount of information. As Internet and wireless communication is widely used, the transmission of videos or motion pictures through Internet or wireless network is still limited. This not only impair the development of Internet and wireless network, it also impairs the improvement of the quality of life in our society. Using the method and system of the present invention, the capacity of data (such as videos or motion pictures) transmission through Internet or wireless network can be greatly increased, so that it will greatly increase the development of our society.

SUMMARY OF THE INVENTION

It is an object of the invention to provide a method and system for compressing and decompressing data streams, wherein the compressing and decompressing process can be repeated to enable a repetitive reductions of the sizes of the data streams.

In one preferred embodiment, the present invention provides a method and system for compressing and decompressing data streams. A data stream is first divided into one object or numbers of data objects. Then, the data stream can be processed to obtain the compression base value or values or compression coding table. Alternatively, one or more predetermined compression values or compression coding table can be provided. At the beginning of the compressing process, a particular data object, typically the first data object of a number of data objects, is extracted from a data stream to be compressed. The data object is first processed to select the corresponding compression code or compression base value for the data object. If only one compression base value is used for all data objects, the compression base value is predetermined before this step. Then, one or more compressed data result or results of the data object is obtained based on the compression base value. The compressed data object is then obtained including the compressed data result or results, or the compression code. Subsequently, all data objects of the data stream are compressed by conducting the compressing process for each data object. The compressed data objects can be compressed further, or the compressed data objects can be combined into a compressed data stream and then to be compressed further. The compression process can be repeated for numerous times. Then, the final compressed data stream is stored in a storage media or transmitted to one or more receivers (such as remote computers). Next, the compressed data stream is retrieved from the storage media or receiver to be decompressed. The decompressing process is basically reverse of the compressing process, wherein the compressed data stream is divided into compressed data objects, and the compressed data result or results or the compression code and/or compression base value for each data object are obtained from each of the compressed data object, wherein each of the data object can be obtained by processing the compressed data result or results, or the compression code and/or the compression base value. If repetitive compressing is conducted, the decompressing process will be repeated. The final data objects are combined to obtain the data stream. If repetitive compressing is conducted in this level, the decompressing process will be repeated in this level. Last, the decompressed data (i.e., the original data stream) will be stored and/or used as word, data, image, sound or mixed files.

Furthermore, the invention covers a computer program product with a computer-readable medium and a computer program stored on the computer-readable medium with program coding means which are suitable for carrying out the above described method when the computer program is run on a computer.

DETAILED DESCRIPTION OF THE PREFERRED EMBODIMENTS

It is not intended to limit the invention to the embodiments illustrated as below. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be obvious to one skilled in the art, upon reading this disclosure, that the present invention may be practiced without these specific details. Meanwhile, well-known structures and devices are not described in detail.

Figure 1A:
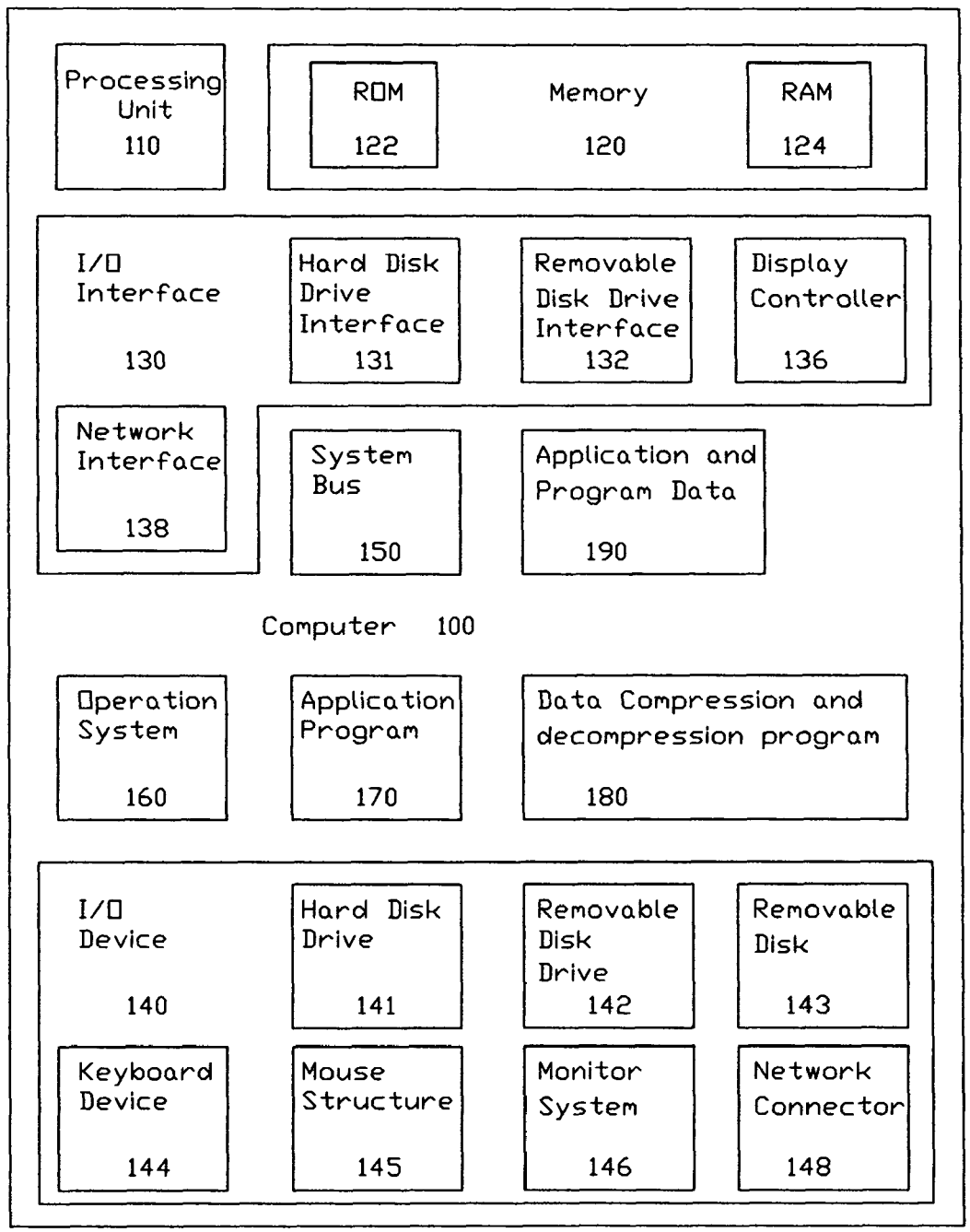
FIG. 1A is a block diagram illustrating a computer of an exemplary computer system used as part of a data compressing and decompressing system in accordance with one embodiment of the present invention.
Figure 1B:
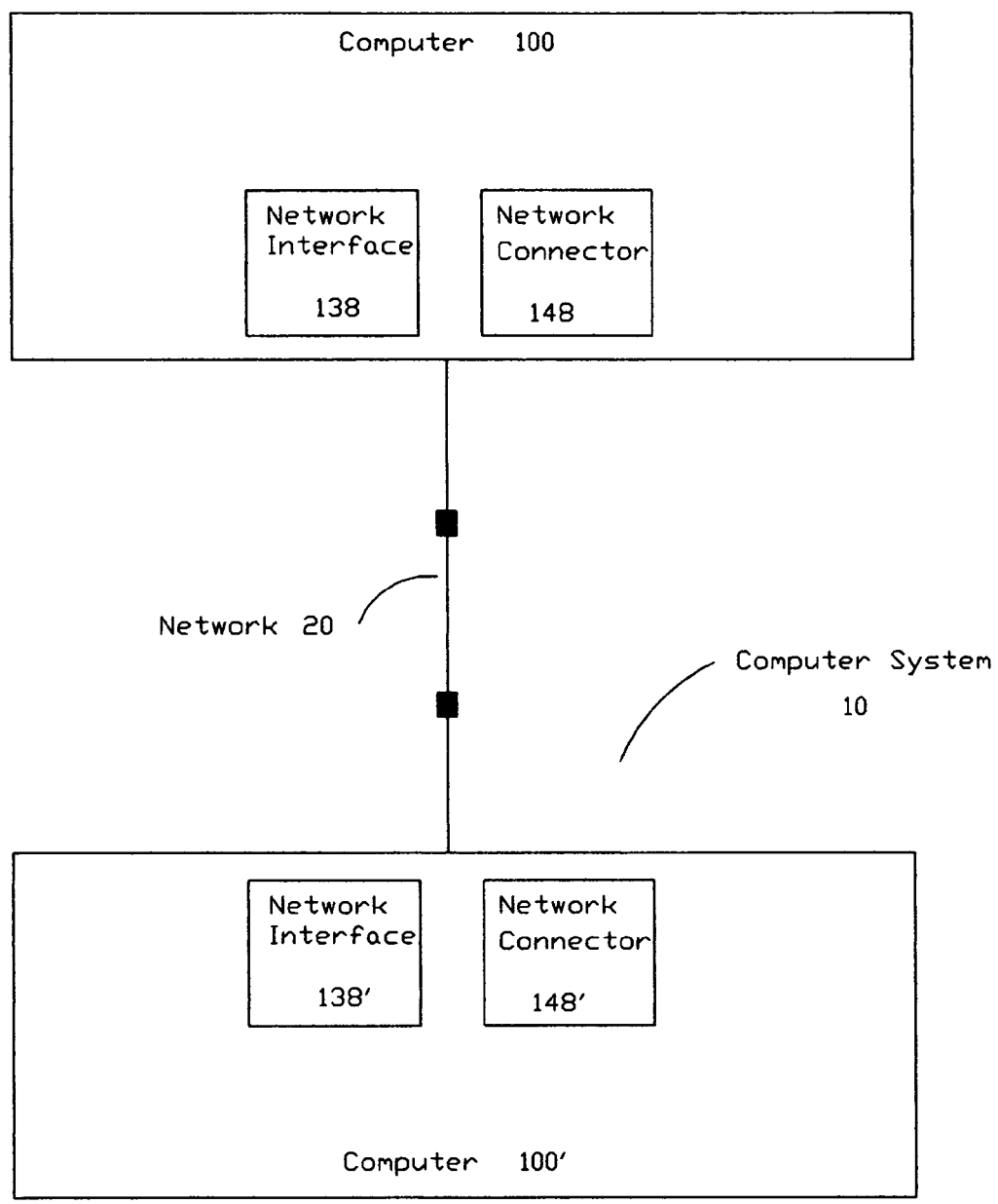
FIG. 1B is a block diagram illustrating an exemplary computer system used as part of a data compressing and decompressing system in accordance with one embodiment of the present invention.
Figure 1C:
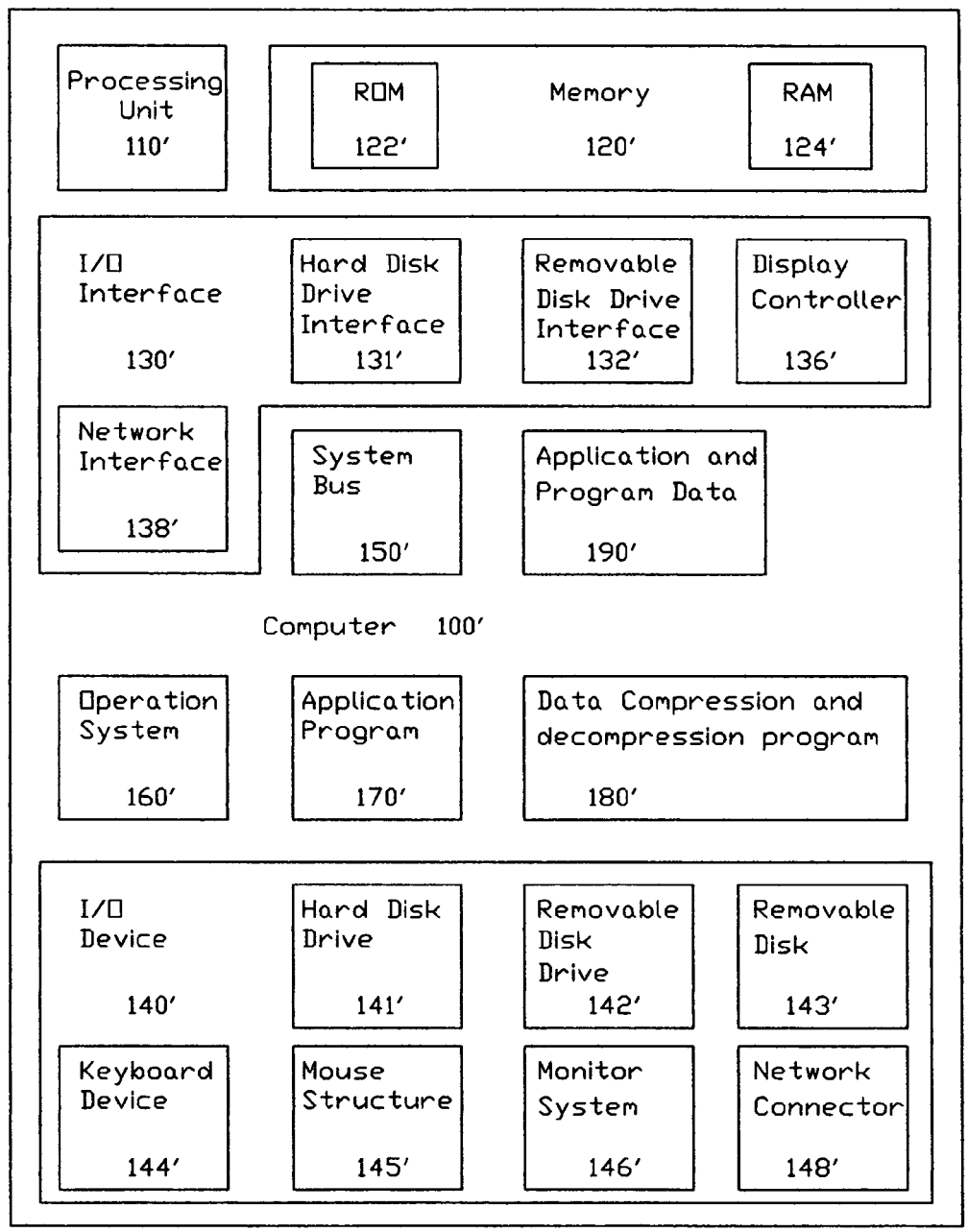
FIG. 1C is a block diagram illustrating a remote computer of an exemplary computer system used as part of a data compressing and decompressing system in accordance with one embodiment of the present invention.

Referring to FIG. 1A, FIG. 1B, and FIG. 1C, portions of the present invention are comprised of computer-readable and computer executable instructions which reside, for example, in computer-usable media of a computer system. FIG. 1A, FIG. 1B, FIG. 1C illustrates an exemplary computer system 10 according with one embodiment of the present invention. It is appreciated that the computer system 10 of FIG. 1A, FIG. 1B, FIG. 1C is exemplary only and that the present invention can operate within a number of different computer systems including general purpose computer systems, embedded computer systems, and stand alone computer systems. The computer system 10 includes a computer 100, having at least a processing unit 110, a memory 120, an I/O interface 130, an I/O device 140, and a system bus 150 that interconnects various system components to the processing unit 110. The memory 120 includes at least one read only memory (ROM) 122 and one random access memory (RAM) 124. A basic I/O interface 130, containing the basic routines that help to transfer information between elements within the computer 100, such as during start-up, is stored in ROM 122. The system bus 150 comprises bus structures such as address buses, data buses, and control buses.

The I/O device 140 includes one or more hard disk drive 141, one or more removable disk (such as magnetic disk or optical disk) drive 142, e.g., to read from or write to a removable disk (such as magnetic disk, optical disk) 143. The hard disk drive 141 and the removable disk drive 142 are connected to the system bus 150 by a hard disk drive interface 131, and a removable disk drive interface 132, respectively. The drives and their associated computer-readable media provide non-volatile storage of data, data structures, computer-executable instructions (program code such as dynamic link libraries, and executable files), etc. for the computer 100. Although the description of computer-readable media above refers to a hard disk, a removable magnetic disk and/or a CD, DVD, it can also include other types of media that are readable by a computer, such as magnetic cassettes, flash memories, and the like.

The I/O device 140 further includes a keyboard 144, and a pointing device such as a mouse 145. Other input devices (not shown) may include a microphone, joystick, game pad, antenna, touch-screen, scanner, or the like. These and other input devices are often connected to the processing unit 110 through a serial port interface, parallel port interface, or universal serial bus (USB) that is coupled to the system bus. A Monitor 146 (or other type of display device) is also connected to the system bus via an interface, such as a display controller or video adapter 136. The other peripheral output devices (not shown), such as speakers and printers, can also be connected to the system bus via output interfaces.

The I/O device 140 further includes a network connector 148 for connecting to a network 20 via a network interface 138. As shown in FIG. 1B, through the network 20, the computer 100 can be connected to other computers, such as a remote computer 100'. The remote computer 100' may be a server, a router, a peer device or other common network node, typically includes many or all of the elements described in the computer 110. In a preferred embodiment, as shown in FIG. 1C, the remote computer 100' includes all of the elements described in the computer 110. The network 20 could be a local area network (LAN), or a wide area network (WAN), or a wireless network. Such networking environments are commonplace in offices, enterprise-wide computer networks, intranets and the Internet. When used in a LAN networking environment, the computer 100 is connected to the local network through a network interface or adapter. When used in a WAN networking environment, the computer 100 typically includes a modem or other means for establishing communications over the wide area network, such as the Internet. The modem, which may be internal or external, is connected to the system bus 150 via the serial port interface. When used in a wireless network environment, the computer 100 typically includes a wireless connection, which is connected to the system bus 150 via the wireless network interface. In a networked environment, program modules depicted relative to the computer 100, or portions thereof, may be stored in the remote memory storage device. The network connections shown are merely examples and other means of establishing a communications link between the computers may be used.

A number of program modules and data may be stored in the hard drives and/or removable disks, and RAM 124, including an operating system 160, one or more application programs 170, a data compression and decompression program 180, and application and program data 190. A user may enter commands and information into the personal computer 100 through a keyboard 144 and a mouse 145.

Figure 2:
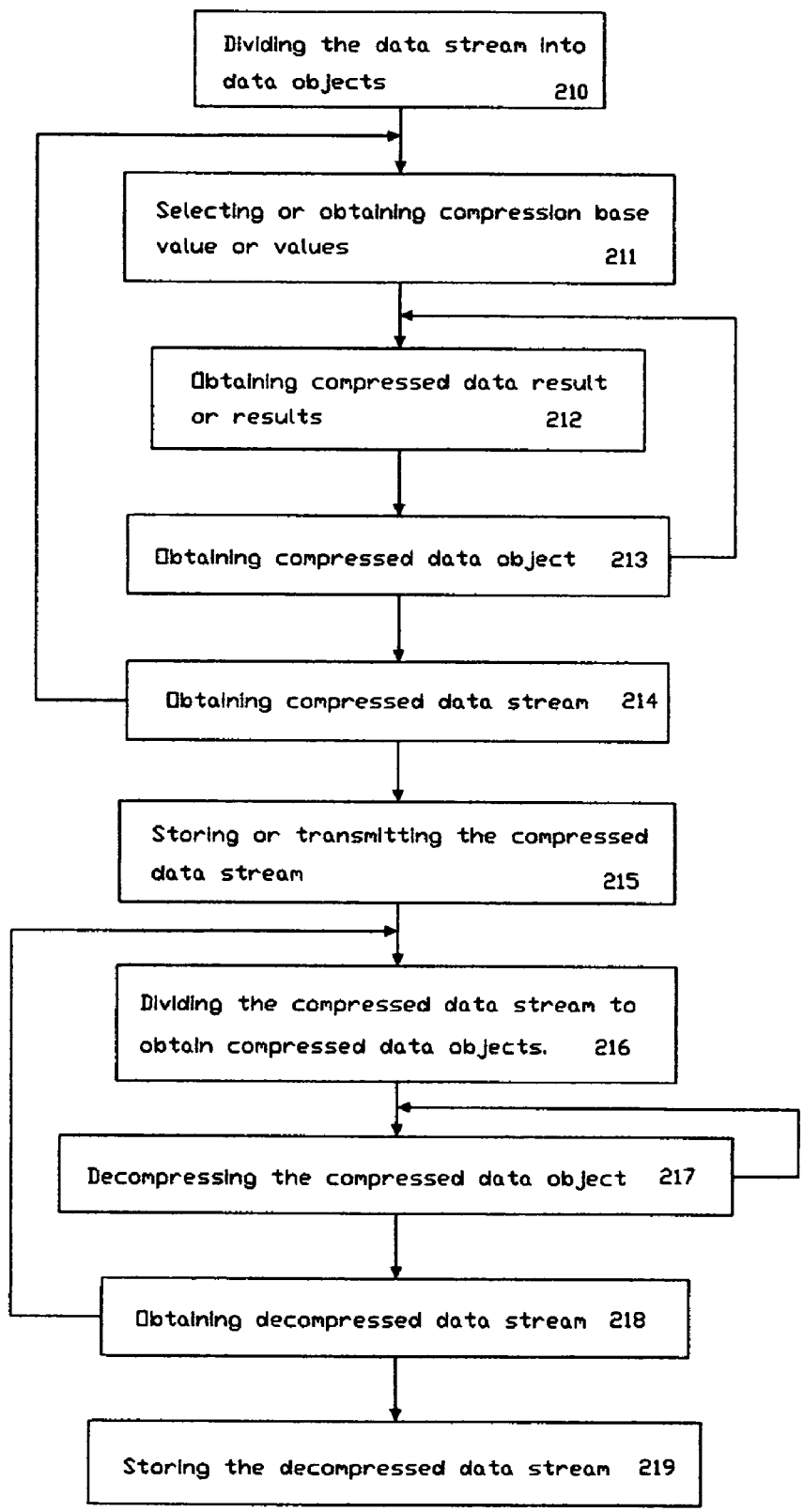
FIG. 2 is a flow diagram illustrating the process of data compressing and decompressing method according to one embodiment of the present invention.

FIG. 2 is a diagram for explaining the steps of a data compression and decompression method 200 according to one preferred embodiment of the present invention. As shown in FIG. 2, in step 210, a data stream is divided into various data objects. In step 211, the data objects are processed to obtain one or more compression base values. Alternatively, the compression base value or values can be predetermined by the data compression and decompression program 180. In step 212, the data objects are processed one by one, typically starting from the first data object. If only one compression base value is determined for all the data objects, the data object of the data stream is processed to obtain compressed data result or results of the data object according to the compression base value. If more than one compression base values are provided, the data object is first processed to determine a corresponding compression base value, and then the data object is processed to obtain compressed data result or results of the data object according to the compression base value. In step 213, the compressed data result or results are compiled (including or not including the corresponding compression base value) into a compressed data object. The step 212 and the step 213 can be repeated to further compress the compressed data object. Each data object is compressed by conducting the step 212 and the step 213 at least once. In step 214, the final compressed data objects are combined into compressed data stream. The compressed data stream can be further compressed by repeating the step 210, the step 211, the step 212, the step 213, and the step 214. In step 215, the final compressed data stream is sent to one or more data storage media or one or more data receiver (such as the remote computer 100'). In step 216, the compressed data stream starts to be decompressed in the remote computer 100'. The compressed data stream is divided into compressed data objects according to the information in the compressed data stream and the operation of the data compression and decompression program 180'. In step 217, the compressed data objects are processed one by one. The compressed data result or results and the compression base value of the compressed data object are obtained, wherein the compressed data object can be decompressed by processing the compressed data result or results with the compression base value. If repetitive compressing is conducted, the decompressing process will be repeated. Each of the compressed data object is decompressed by conducting the step 217. In step 218, the final data objects are combined to obtain a decompressed data stream. If repetitive compressing is conducted in this level, the decompressing process will be repeated in this level. In step 219, the final decompressed data stream (i.e., the original data stream) is stored in the hard disk drive 141' or removable disk 143', or is used by one or more application programs as word files, data files, image files, sound files, or files with mixed information.

As a practical example, when the data compression and decompression method is used in the computer system 10, the computer 100 is used for data compression. The compressed data stream can be stored in the removable disk 143, or transmitted through the network 20. The remote computer 100' will receive the compressed data stream from the removable disk 143, through the network 20, or other transmission devices. The remote computer will then decompress the compressed data stream and compile the decompressed data stream to a file for used. At the start of the data compression and decompression process, a data stream can be loaded to the computer 100 through removable disk 143, through the network 20, or by any other inputting means. In step 210, as the data compressing process begins, the processing unit 110 will operate according to operating system 160 and the data compression and decompression program 180, and the data stream to be compressed can be first loaded to the RAM 124, then to be divided into various data objects, or the data stream can be first divided into various data objects, then to be loaded into the RAM 124. In one preferred embodiment, the data objects are in the same length, wherein the length of the data objects can be predetermined by the data compression and decompression program 180, or the length of the data objects can be determined according to the size of the data stream or the possible compression base values for the data objects. Alternatively, the data objects can be in different lengths, wherein the length of each of the data objects can be determined according to the possible compression base values for the data objects so that maximum data compression can be obtained. In step 211, for data objects having the same length, one or more compression base values can be either predetermined according to the length of the data objects or selected according to the content of the data objects. If the compression base value or values are predetermined, they will be provided according to the data compression and decompression program 180. If the compression base value or values are selected according to the content of the data objects, the process unit 110 will process each data object, and select the possible compression base value or values in order to obtain best compression ratio for all the data objects. In step 212, the data objects are being processed one by one. Each data object can be processed to obtain a compressed data result or results. If there is only one compression base value for all the data objects, the compression based value is first provided by the data compression and decompression program 180 or selected in the step 211, and the compressed data result is obtained according to the compression base value. If different compression base values are used for different data objects, the process unit 110 will first read the data object to determine the compression base value for the data object, based on the possible compression base values selected in the step 211. Then, the compressed data result or results are obtained according to the compression base value. In step 213, the compressed data result or results are compiled into a compressed data object. If there is only one compression base value for all the data objects, there is no need to indicate the compression base value used in each compressed data object. Eliminating compression base value in the compressed data object may reduce the size of the compressed data object if the compressed data result or results are in small size. The common compression base value can be indicated in the beginning or end of the compressed data stream. If there is just one compression base value for any kind of data stream, the compression base value could be part of the program data provided in the data compression and decompression program 180, and no need to be included in the compressed data stream. If different compression base values are used for different data streams, or, different compression base values are used for different data objects, the compression base value for each data object needs to be included in the compressed data object. Usually, the compression base values are represented in the compressed data objects in code form so that to reduce the size of the compressed data objects. The purpose for using more than one compression base values for different data objects is to reduce the size of the compressed data result or results for different data objects, so that the size of the compressed data object can be reduced. The step 212 and the step 213 can be repeated to further compress the compressed data object. Each data object is compressed by conducting the step 212 and the step 213 for at least once. In step 214, the final compressed data objects are combined into a compressed data stream. If there is only one compression base value for all the data objects in the data stream, the common compression base value can be indicated in the beginning or end of the compressed data stream. If there is just one compression base value for any kinds of data streams, the compression base value could be part of the program data provided in the data compression and decompression program 180, no need to be included in the compressed data stream. At the beginning or end of the compressed data stream, other information can also be included providing general information for decompression. The compressed data stream can be further compressed by repeating the step 210 to the step 214. In step 215, the final compressed data stream is sent to one or more data storage media, such as the hard disk drive 141, or the removable disk 143. The compressed data stream in the hard disk drive 141 can be saved to the removable disk 143 later. The removable disk 143 can be sent to a remote location and the removable disk 143' of the remote computer 100' can read the compressed data stream and save the compressed data stream to the hard disk drive 141'. The final compressed data stream can also be sent to one or more data receiver, such as the remote computer 100', through the network 20 (either the local area network (LAN), or the wide area network (WAN), or the wireless network), using the network connector 148 and 148' via network interface 138 and 138'. The compressed data stream is saved into the hard disk drive 141' of the remote computer 100'. In step 216, the compressed data stream begins to be decompressed in the remote computer 100'. The data compression and decompression program 180' of the remote computer 100' can load the compressed data stream from the hard disk drive 141', or from the removable disk 143'. The compressed data stream can be loaded to the RAM 124', then be divided by the process unit 110' according to the information in the compressed data stream and data compression and decompression program 180'. Or, the compressed data stream can be first divided by the process unit 110' according to the information in the compressed-data stream and data compression and decompression program 180', then be loaded to the RAM 124'. In step 217, one of the compressed data objects is processed by the process unit 110'. The compressed data result or results and/or the compression base value are obtained from the compressed data object, and the decompressed data object can be obtained by processing the compressed data result or results with the compression base value according to the data compression and decompression program 180'. If the compression base value is common for all data objects, the compression base value is obtained from the compressed data stream or the program data of the data compression and decompression program 180'. If repetitive compressing is conducted for the data object, the decompressing process will be repeated. The compressed data objects are decompressed by conducting the step 217 for at least once for each data object. In step 218, the final data objects are combined to obtain a decompressed data stream. If repetitive compressing is conducted on this level, the decompressing process will be repeated on this level. In step 219, the final decompressed data stream (i.e., the original data stream) is stored in the hard disk drive 141' or removable disk 143', to be used by one or more application programs as word files, data files, image files, sound files, or files with mixed information.

Each of the data objects are treated as one numeric number that can be obtained by numeric calculations of other numbers. To illustrate this method, a data object 10011001100110011001100110011010 (that would take storage spaces) is treated as a large size number in binary form that can be converted to a decimal number $2576980378_{10}$. The decimal $2576980378_{10}$ can be obtained by multiply $4294967296_{10}$ (a decimal number equals to the binary number $100000000000000000000000000000000_2$) with $0.6_{10}$ (a decimal number). The decimal number $0.6_{10}$ can be coded in different ways. The traditional binary form for $0.6_{10}$ will be 0.10011001100 . . . . Or, $0.6_{10}$ can be coded with a method that use an indicational code to indicate that it is a fractional number and another indicational code to indicate that it is a pure fractional number, and then the part of the fractional number will be coded as a binary whole number, so that $0.6_{10}$ will be coded as 00110 (as in FIG. 3A. For number such as 32.45, the whole number part and pure fractional part can be coded separately.) If $100000000000000000000000000000000_2$ (equals to decimal number $4294967296_{10}$) is used as a compression base value for all the data objects, we can just indicate it once, and then omit it for all the data objects. Thus, the compressed data result for $10011001100110011001100110011010_2$ ($2576980378_{10}$) would be $0.6_{10}$, which can be coded as 00110. For a data object 10000000000000000000000000000000 (which can be converted to a decimal number $8589934592_{10}$), using the same compression base value, the compressed data result will be $10_2$ ($2_{10}$). Of course not all numbers can be obtained by multiple the compression base value with small size numbers, if the compression base value is fixed. For example, $1431655765_{10}$ ($1010101010101010101010101010101_2$) can be obtained by multiple $4294967296_{10}$ ($100000000000000000000000000000000_2$) with $0.3333333333_{10}$. But $1431655765_{10}$ ($1010101010101010101010101010101_2$) can also be obtained by dividing $4294967296_{10}$ ($100000000000000000000000000000000_2$) by $3_{10}$ ($11_2$). Similarly, $4294967292_{10}$ ($11111111111111111111111111111100_2$) can by obtained by multiply $4294967296_{10}$ ($100000000000000000000000000000000_2$) with $0.999999999_{10}$, and it can also be obtained by deducting $4_{10}$ ($1001_2$) from $4294967296_{10}$ ($100000000000000000000000000000000_2$). And, $4294967300_{10}$ ($100000000000000000000000000000100_2$) can be obtained by multiply $4294967296_{10}$ ($100000000000000000000000000000000_2$) with $1.000000001_{10}$, or it can be obtained by adding $4_{10}$ ($100_2$) to $4294967296_{10}$ ($100000000000000000000000000000000_2$). Therefore, we can use an indication code to indicate whether the compression base value should be add to, deduct from, multiple with, or divide by the compressed data result; so that small size compressed data results may be obtained.

In practice, a look up table can be provided so that for a given data object using certain compression base value, the compressed data result or results will be provided by the look up table, thus no mathematic calculation is needed. In order to avoid fractional number and maintain lossless compression, a data object can be obtained by multiplying the compression base value with a first compressed data result and adding (or deducting) a second compressed data result, or a data object can be obtained by dividing the compression base value by a first compressed data result and adding (or deducting) a second compressed data result. Further, the data objects can be obtained by applying other arithmetic operations to the compressed data result or results with or without compression base value or values.

When one compression base value is used to obtain compressed data results for all the data objects, the compression base value selected will determine the compression ratio of the compressed data stream. The compression base value can be predetermined according to the size of the data objects, preferably a number that takes about half size of the data objects. For example, if the data objects have sixty four digits, the compression base value may be 10000000000000000000000000000000. The compression base value can also be decided after scanning the data objects, or by the data stream type. Compression base value can also be changed during the compressing process, and the change of the compression base value would be reflected in the compressed data stream. Alternatively, different compression base values can be used for different data objects. In this case, the compression base value or values will be indicated in the compressed data objects, usually coded to reduce the length.

Figure 3A:
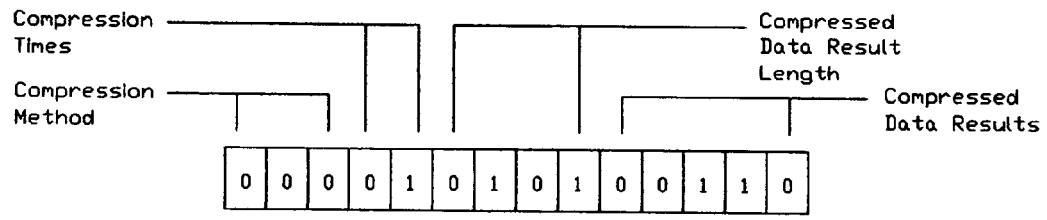
FIG. 3A is an example of a compressed data object according to one embodiment of the present invention.

When one compression base value is used and the compression base value is fixed according to the data object size, the compression base value would not need to be indicated in the compressed data stream. Thus, the compressed data stream will mostly contain compressed data results. It may also contain indicational codes such as codes to indicate the compression status of the data, the type of compression method, the length of the compressed data results, times the compressing process have been conducted, etc. FIG. 3A is an example of a compressed data object. As shown in FIG. 3A, the first, second and third digits of the compressed data object indicate compression method of the compressed data object. In this example, as three digits are used for indicating the compression method, there are total of eight alternative compression methods. In this example, "000" is used for a compression method that has only one compression base value for all the data objects of the data stream, thus the compression base value is not included in the compressed data object. In this example, the method indicated by "000" also means that there is only one compressed data result for each data object and that the compression base value will be multiplied with the compressed data result to obtain the data object to be compressed. The fourth, fifth digits of the compressed data object indicate how many times the compressing process has been conducted for the original data object. In this example, as two digits are used for indicating the total times that the original data object has been compressed, the original data object can be compressed for a total of four times. In this example, "01" indicates only one compressing process has been conducted to the original data object. The sixth, seventh, eighth, ninth digits of the compressed data object indicate the length of the compressed data result. In this example, as four digits are used for indicating the length of the compressed data result, the maximum length of the compressed data result can be sixteen digits. In this example, the tenth, eleventh, twelfth, thirteenth, fourteenth digits of the compressed data object contain the compressed data result. In this example, the tenth digit of the compressed data object indicates whether or not the compressed data result is a fractional number or a whole number. For example, when the tenth digit is "0", the compressed data result is a fractional number. When the tenth digit is "1", the compressed data result is a whole number. The eleventh digit of the compressed data object indicates that the compressed data result is a pure fractional number. The twelfth, thirteenth, fourteenth digits of the compressed data object contain the value of the fractional number.

Alternatively, when the possible compressed data results are in large sizes, to reduce the size of the compressed data objects and satisfy the capacity of lossless compression, the sixth, seventh, eighth, ninth digits of the compressed data object could be used to indicate the total segments of the compressed data result. Therefore, the compressed data result can contain a maximum of sixteen segments. If each segment contains two digits, the compressed data result can contain a maximum of thirty two digits. If each segment contains three digits, the compressed data result can contain a maximum of forty eight digits, and so on. At the last segment, an end code is provided to indicate the end of the compressed data result and every compressed data result will end by the end code. For example, "1" could be an end code, and if there are still spaces left in the last segment, the spaces after the end code "1" will be filled with "0"s. Alternatively, the lengths of the compressed data results are not first indicated in the compressed data objects. For this example, the compressed data result will start at the sixth digit of the compressed data object. Different methods can be used to indicate the length of the compressed data results. For example, the compressed data result can be divided into segments with equal digits, and the first or last digit of each segment indicates whether this segment is the last segment of the compressed data result. If "1" indicates the last segment and "0" indicates the segments other than the last segment, and the first digit of each segment is used to indicate whether the segment is the last segment, and compressed data result is coded in segments each having four digits, then a compressed data result 11010010011101 will be coded in the compressed data object as 01100100010001111011 (the "1" at the end is the end code as mentioned above in this paragraph). Thus the compressed data result in FIG. 3A can be coded as 00011101.

Alternatively, different compression base values can be used simultaneously for different data objects. In this case, each compression base value will be assigned a compression base value code to replace the compression base value and appear in the compressed data object. Usually, the compression base value codes would take significantly less spaces than the compression base values, and the compressed data objects should take less spaces. Different alternative methods of compression can be used and the results to be compared to obtain the best compressing method.

Figure 3B:
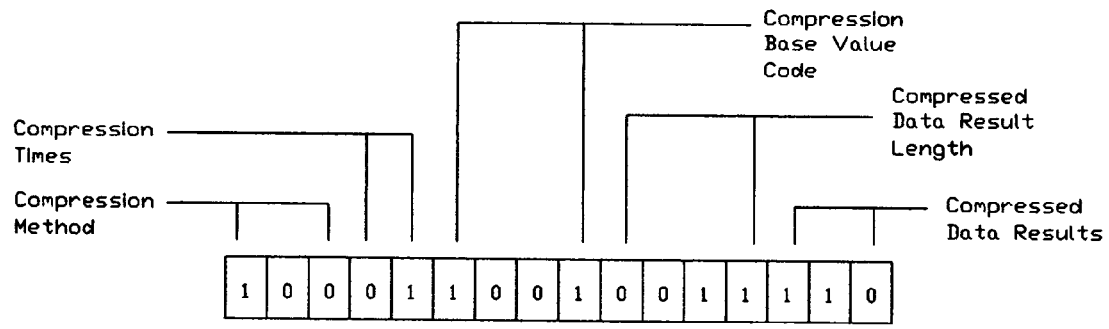
FIG. 3B is an example of a compressed data object according to an alternative embodiment of the present invention.

When different compression base values are used simultaneously for different data objects, the compressed data stream will contain compression base value codes, as well as the compressed data results. It may also contain indicational codes such as codes to indicate the compression status of the data, the type of compression method, the length of the compressed data results, etc. FIG. 3B is another example of the compressed data object. As shown in FIG. 3B, the first, second and third digits of the compressed data object indicate compression method of the compressed data object. In this example, as three digits are used for indicating the compression method, there are total of eight alternative compression methods. In this example, "100" is used for a compression method that has more than one compression base values for all the data objects of the data stream and one compression base value for each data object, thus the compression base value for the data object needs to be included in the compressed data object. In this example, the method indicated by "100" also means that there is only one compressed data result for each data object and that the compression base value will be multiplied with the compressed data result to obtain the data object to be compressed. The fourth, fifth digits of the compressed data object indicate how many times the compressing process has been conducted for the original data object. In this example, as two digits are used for indicating the total times that the original data object has been compressed, the original data object can be compressed for a total of four times. In this example, "01" indicates only one compressing process has been conducted to the original data object. The sixth, seventh, eighth, ninth digits of the compressed data object contain the code for the compression base value for the data object. Since four digits are used to contain the code, the total possible compression base values are sixteen. Similar to the method referred to in FIG. 3A, in this example, the tenth, eleventh, twelfth, thirteenth digits of the compressed data object indicate the length of the compressed data result. In this example, the fourteenth, fifteenth, sixteenth digits of the compressed data object contain the compressed data result. In this example, the fourteenth digit of the compressed data object indicates whether or not the compressed data result is a fractional number or a whole number. For example, when the tenth digit is "0", the compressed data result is a fractional number. When the tenth digit is "1", the compressed data result is a whole number. If the fourteenth digit of the compressed data object contains "1", then the fifteenth digit of the compressed data object is the starting point for the value of compressed data result.

Alternatively, the tenth, eleventh, twelfth, thirteenth digits of the compressed data object could be used to indicate the total segments of the compressed data result. Alternatively, the compressed data results are divided into segments and "1" at the beginning or end of segment will indicate the end of the compressed data result and the compressed data object.

Figure 3C:
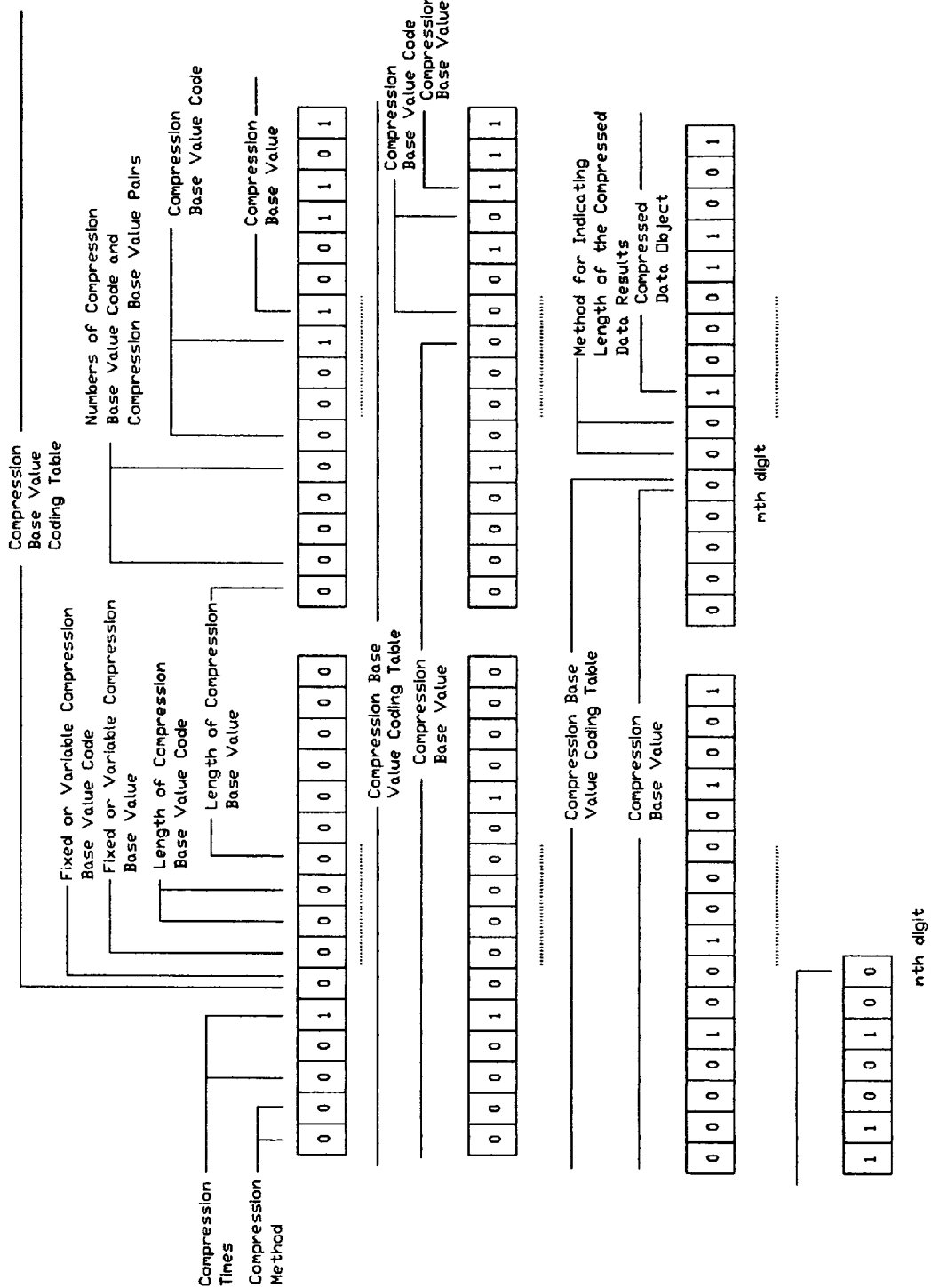
FIG. 3C is an example of a part of the compressed data stream according to one embodiment of the present invention.

The compressed data stream generally comprises the data objects. Usually at the beginning and/or end of the data stream, other information such as the compression methods, common compression base value, or compression base value coding table, times the compression process have been conducted, etc. are presented by indicational codes. FIG. 3C is an example of a part of the compressed data stream. As shown in FIG. 3C, the first and second digits of the compressed data stream indicate compression method of the compressed data stream. The indication of the compression method in the level of the compressed data stream may be more general than in the level of the data object. In this example, as two digits are used for indicating the compression method, there are total of four alternative compression methods. In this example, "10" is used for a compression method that uses compression base values, and has more than one possible compression base values for all the data objects of the data stream. The third, fourth, fifth digits of the compressed data stream indicate how many times the compressing process has been conducted for the original data stream. In this example, as three digits are used for indicating the total times that the original data stream has been compressed, the original data stream can be compressed for a total of eight times. In this example, "001" indicates only one compressing process has been conducted to the original data stream. From the sixth, to the mth digits of the compressed data stream contain the compression base value coding table for the possible compression base values for the data objects of the data stream. The structure of the compression base value coding table could be one compression base value code followed by one compression base value, and so on; or one compression base value followed by one compression base value code, and so on. If the lengths of the compression base value codes and the lengths of the compression base values are variable, indicational codes shall be used to indicate the lengths of the compression base value codes and the lengths of the compression base values. If the lengths of the compression base value codes and the lengths of the compression base values are not variable, then the length of the compression base value codes and the length of the compression base values may first be indicated by the indicational codes only once as in FIG. 3C, and then no indicational codes is needed for the length of each of the compression base value codes and the length of each of the compression base values in the compression base value coding table. The total numbers of pairs of the compression base value codes and the compression base values need to be indicated in the compression based value coding table. The compressed data stream may also contain information about the methods, positions and lengths of the indicational codes in the compressed data objects. Otherwise, these kinds of information will be provided in the data compression and decompression program 180. The data compression and decompression program 180 also provides information about the methods, positions and lengths of the indicational codes in the compressed data stream. In this example, the m+1th, and m+2th digits of the compressed data stream indicate the method to indicate the length of the compressed data values in the compressed data objects. "00" indicates that the lengths of the compressed data values are first indicated by the indicational codes of the compressed data objects. In this example, the compressed data objects start from the m+3th digit, and end at the nth digit of the compressed data stream, which is also the end of the compressed data stream.

Figure 4:
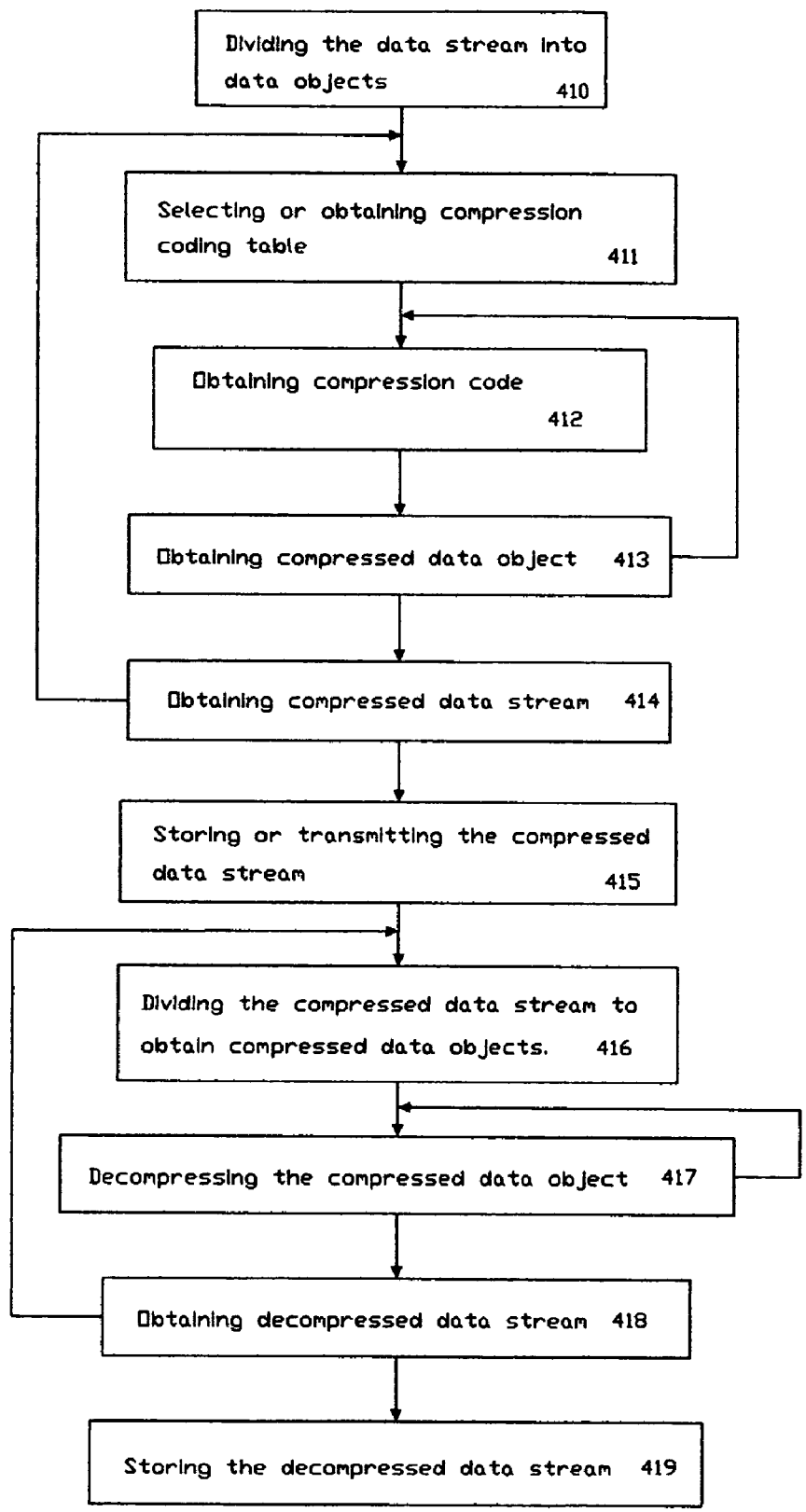
FIG. 4 is a flow diagram illustrating the process of data compressing and decompressing method according to another embodiment of the present invention.

FIG. 4 is a diagram for explaining the steps of a data compression method according to another preferred embodiment of the present invention. As in FIG. 4, in step 410, a data stream is divided into various data objects. In one preferred embodiment, the data objects are in the same length, wherein the length of the data objects can be predetermined by the data compression and decompression program 180, or the length of the data objects can be determined according to the size of the data stream or the possible compression coding tables for the data objects. Alternatively, the data objects can be in different lengths, wherein the length of each of the data objects can be determined according to the possible compression coding tables for the data objects so that maximum data compression can be obtained. In step 411, the data objects are processed to select appropriate compression coding table for the data objects of the data stream. Alternatively, the compression coding table can be predetermined by the data compression and decompression program 180. In step 412, one data object of the data stream is processed to obtain the corresponding compression code according to the selected compression coding table. In step 413, the compression code can be further compressed by obtaining compressed data result or results according to the compressing steps as shown in FIG. 2. The final compressed result or results are compiled (including or not including the corresponding compression base value) into a final compressed data object. Each of the data object is compressed by conducting the step 412 and the step 413. In step 414, the final compressed data objects are combined into a compressed data stream. The compressed data stream can be further compressed by repeating the step 410 to the step 414. In step 415, the final compressed data stream is sent to one or more data storage media or one or more data receiver (such as the remote computer 100'. In step 416, the compressed data stream starts to be decompressed in the remote computer 100'. The compressed data stream is divided into compressed data objects according to the information in the compressed data stream and the operation of the data compression and decompression program 180'. In step 417, one compressed data object is being processed. If the compressed data object contains the compressed data result or results of the compressing process as indicated in FIG. 2, the compressed data result or results and the compression base value are obtained for the compressed data object, and the compressed data object will first be decompressed according to the decompressing process as indicated in FIG. 2. If repetitive compressing is conducted, the decompressing process will be repeated. If the compressed data object comprises compression code, or the compressed data object is decompressed and the decompressing result comprises compression code, a decompressing process will convert the compression code to the final decompressed data object (i.e., the original data object) according to the compression coding table. Each of the compressed data object is decompressed by conducting the step 417. In step 418, the final data objects are combined to obtain a decompressed data stream. If repetitive compressing is conducted on this level, the decompressing process will be repeated on this level. In step 419, the final decompressed data stream (i.e., the original data stream) is stored in the hard disk drive 141' or removable disk 143', to be used by one or more application programs as word files, data files, image files, sound files, or files with mixed information.

Figure 5A:
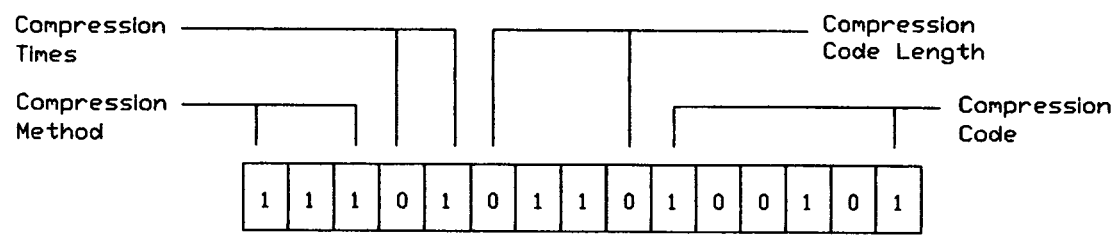
FIG. 5A is an example of a compressed data object according to another embodiment of the present invention.

Each of the data objects is treated as one numeric number that can be represented by a compression code. If the compression coding table is predetermined, the corresponding relationship between each data object and the compression code needs not to be included in the compressed data stream. If more than one compression coding tables are available, the compressed data stream will include information about which compression coding table is used for the data stream. If compression coding table is not predetermined, the compressed data stream will include the compression coding table. FIG. 5A is an example of a compressed data object. As shown in FIG. 5A, the first, second and third digits of the compressed data object indicate compression method of the compressed data object. In this example, as three digits are used for indicating the compression method, there are total of eight alternative compression methods. When the data object can be compressed by the compression code method in combination with the compression base value method, the compression method shall be distinctable by this indicational code. In this example, "111" is used for the compression code method. The fourth, fifth digits of the compressed data object indicate how many times the compressing process has been conducted for the original data object, including using the compression base value method. In this example, as two digits are used for indicating the total times that the original data object has been compressed, the original data object can be compressed for a total of four times. In this example, "01" indicates only one compressing process has been conducted to the original data object. The sixth, seventh, eighth, ninth digits of the compressed data object indicate the length of the compression code. In this example, as four digits are used for indicating the length of the compression code, the maximum length of the compression code can be sixteen digits. In this example, the tenth, eleventh, twelfth, thirteenth, fourteen, fifteen digits of the compressed data object contain the compression code. Alternatively, the sixth, seventh, eighth, ninth digits of the compressed data object could be used to indicate the total segments of the compression code. Alternatively, the compression codes are divided into segments and "1" at the beginning or end of segment will indicate the end segment of the compression code.

Figure 5B:
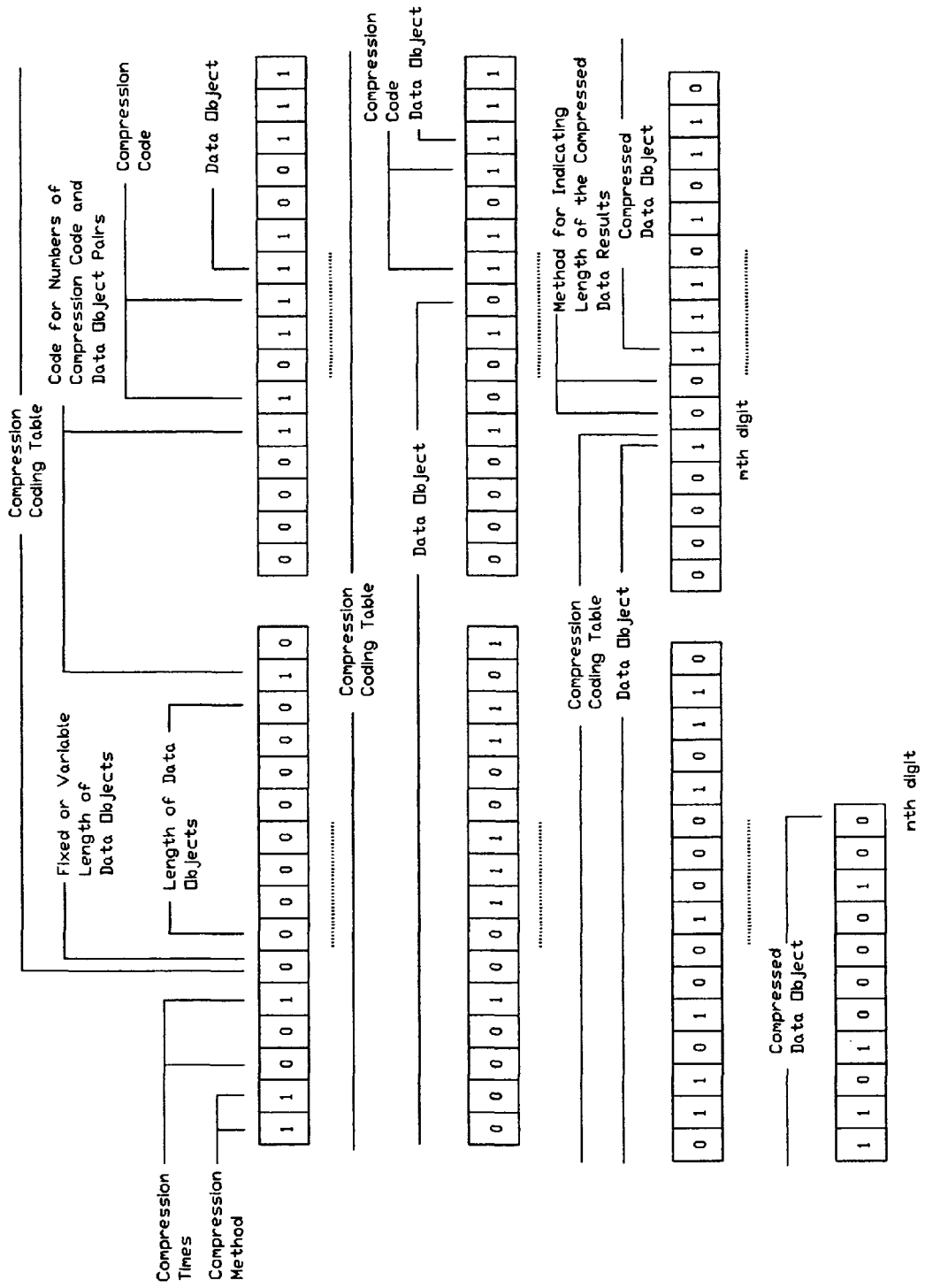
FIG. 5B is an example of a part of the compressed data stream according to another embodiment of the present invention.

FIG. 5B is another example of a part of the compressed data stream. As shown in FIG. 5B, the first and second digits of the compressed data stream indicate compression method of the compressed data stream. The indication of the compression method in the level of the compressed data stream may be more general than in the level of the data object. In this example, as two digits are used for indicating the compression method, there are total of four alternative compression methods. In this example, "11" is used for a compression method that uses compression codes to represent the data objects, wherein the compression coding table is determined by processing the data stream. The third, fourth, fifth digits of the compressed data stream indicate how many times the compressing process has been conducted for the original data stream. In this example, as three digits are used for indicating the total times that the original data stream has been compressed, the original data stream can be compressed for a total of eight times. In this example, "001" indicates only one compressing process has been conducted to the original data stream. From the sixth, to the mth digits of the compressed data stream contain the compression coding table for the possible compression codes for the data objects of the data stream. The structure of the compression coding table could be one compression code followed by one possible data object, and so on; or one possible data object followed by one compression code, and so on. If the lengths of the possible data objects are variable, indicational codes shall be used to indicate the lengths of each of the possible data objects. If the lengths of the possible data objects are not variable, then the length of the possible data objects may first be indicated by the indicational codes only once as in FIG. 5B, and then no indicational codes is needed for the length of each of the possible data objects in the compression coding table. The total numbers of pairs of the compression codes and the possible data objects need to be indicated in the compression coding table. In this example, the total numbers of pairs of the compression codes and the possible data objects are indicated by an indicational code. In this example, each of the compression codes is divided into segments with equal length of digits, and the first or last digit of each segment indicates whether this segment is the last segment of the compression code. If "1" indicates the last segment and "0" indicates the segments other than the last segment, and the first digit of each segment is used to indicate whether the segment is the last segment, and compression code is coded in segments each having four digits, then a compression code "1001101" will be expressed as "010001101110". In this example, the compressed data objects start from the m+1th digit, and end at the nth digit of the compressed data stream, which is also the end of the compressed data stream. The compressed data stream may also contain information about the methods, positions and lengths of the indicational codes in the compressed data objects.

To illustrate this method, a first data object which is considered as a large number could be coded as 1, a second data object could be coded as 10, a third data object could be coded as 11, and so on. Since the data objects have many digits, the digits of the codes will increase for the codes to represent all the possible combination of the data objects. Therefore, some data objects can be coded with significant compression, while many other data objects will not be coded with significant compression. To achieve better compression, the data stream can be first scanned to obtain the frequencies for each data objects to appear, and assign the data objects that appear most frequently with the least digits (similar to Huffman coding method).

As an example of this method, information for motion pictures or video signals can be divided into data objects that can be compressed using the method of the present invention. One frame of the images can be represented by one code, or the information in one image can be divided into several data objects, and each can be represented by one code.

What is claimed is:

1. A method for handling a data stream having a number of data objects, comprising:
   a step of selecting one or more numerical value as a compression base value;
   a step of receiving the compression base value; and
   a step of performing a compressing process on a data object based on a compression base value to obtain at least one compressed data result, wherein the data object is considered as one numerical value;
   wherein the compressed data result is the direct result of mathematical operation on the data object using compression base value, wherein the compression process can be used to further compress the compressed data result.

2. A method according to claim 1, further comprising a step of compiling the compressed data result to a compressed data objects.

3. A method according to claim 2, further comprising a step of combining the compressed data objects to a compressed data stream.

4. A method according to claim 3, further comprising a step of sending the compressed data stream to a receiving means.

5. A method according to claim 4, further comprising a step of dividing the compressed data stream in the receiving means into at least one compressed data objects.

6. A method according to claim 5, further comprising a step of obtaining the compressed data result from the compressed data object.

7. A method according to claim 6, further comprising a step of obtaining at least one decompressed data object.

8. A method according to claim 7, further comprising a step of combining the decompressed data objects to a decompressed data stream.

9. A method according to claim 7, further comprising a step of sending the decompressed data stream to a second receiving means.

10. A computer program product with a computer-readable medium and a computer program stored on said computer-readable medium with program coding means which are suitable for carrying out a method according to claim 1 when said computer program is run on a computer.

11. A method for handling data having a number of data objects, comprising: performing a compressing process on a data object by obtaining a compression code for the data object according to a compression coding table, wherein the data object is considered as one numerical value, wherein the compression code is the direct result of mathematical operation on the data object using one or more compression base value, wherein the compression process can be repeated on the result of the prior compression process.

12. A method according to claim 11, further comprising a step of compiling the compression code to a compressed data objects.

13. A method according to claim 12, further comprising a step of combining the compressed data objects to a compressed data stream.

14. A method according to claim 13, further comprising a step of sending the compressed data stream to a receiving means.

15. A method according to claim 14, further comprising a step of dividing the compressed data stream in the receiving means into at least one compressed data objects, a step of obtaining the decompressed data object from the compressed data object, a step of combining the decompressed data objects to a decompressed data stream, and a step of sending the decompressed data stream to a second receiving means.

16. A device for handling a data stream having a number of data objects, comprising a compression means for compressing the data objects according to a compression base value, wherein the each data object is considered as one numerical value respectively, wherein the compression means directly use the compression base value to conduct mathematical operation on the data object, wherein the compression process can be repeated on the result of the prior compression process.

17. A device as described in claim 16, further comprising a selecting means for selecting a compression base value for the data objects.

18. A device as described in claim 17, further comprising a combining means for combining the compressed data objects to a compressed data stream, a storage means for storing the compressed data stream, a transmitting means for transmitting the compressed data stream, a decompressing means for decompressing compressed data stream.

* * * * *